United States Patent
Stanford

[15] 3,636,440
[45] Jan. 18, 1972

[54] ISOLATION-GUARDING MEASURING INSTRUMENT FOR IN-CIRCUIT COMPONENT TESTING

[72] Inventor: Melvin E. Stanford, Ballston Spa, N.Y.
[73] Assignee: Systomation, Inc., Schenectady, N.Y.
[22] Filed: May 27, 1970
[21] Appl. No.: 41,717

Related U.S. Application Data

[63] Continuation of Ser. No. 713,436, Mar. 15, 1968.

[52] U.S. Cl. .............................................324/57 R, 324/62
[51] Int. Cl. .......................................................G01r 27/00
[58] Field of Search ...............................324/57, 60, 62, 158

[56] References Cited

UNITED STATES PATENTS 2,866,948  12/1958  Witt .........................................324/62

Primary Examiner—Edward E. Kubasiewicz
Attorney—Charles W. Helzer

[57] ABSTRACT

A portable, isolation-guarding measuring instrument that may be easily carried by electronic technicians, television service repairmen, etc. The instrument comprises a suitable meter movement of the voltmeter-type for providing an indication of the magnitude of an electrical signal and having first and second input measurement terminal leads for coupling the opposite terminals of an in-circuit component to be measured to the meter movement and to an excitation signal. A third isolation-guarding terminal lead maintained at essentially the same potential as the potential of one of the first and second input measurement terminal leads, is provided for connection to nodal points of other circuit components connected in parallel circuit relationship with the in-circuit component to be measured. As a result, measurement of the actual value of the in-circuit component can be obtained without requiring that the in-circuit component be disconnected even partially from the other components with which it is in circuit relationship.

13 Claims, 4 Drawing Figures

Inventor
Melvin E. Stanford
by Charles W. Helzer
His Attorney

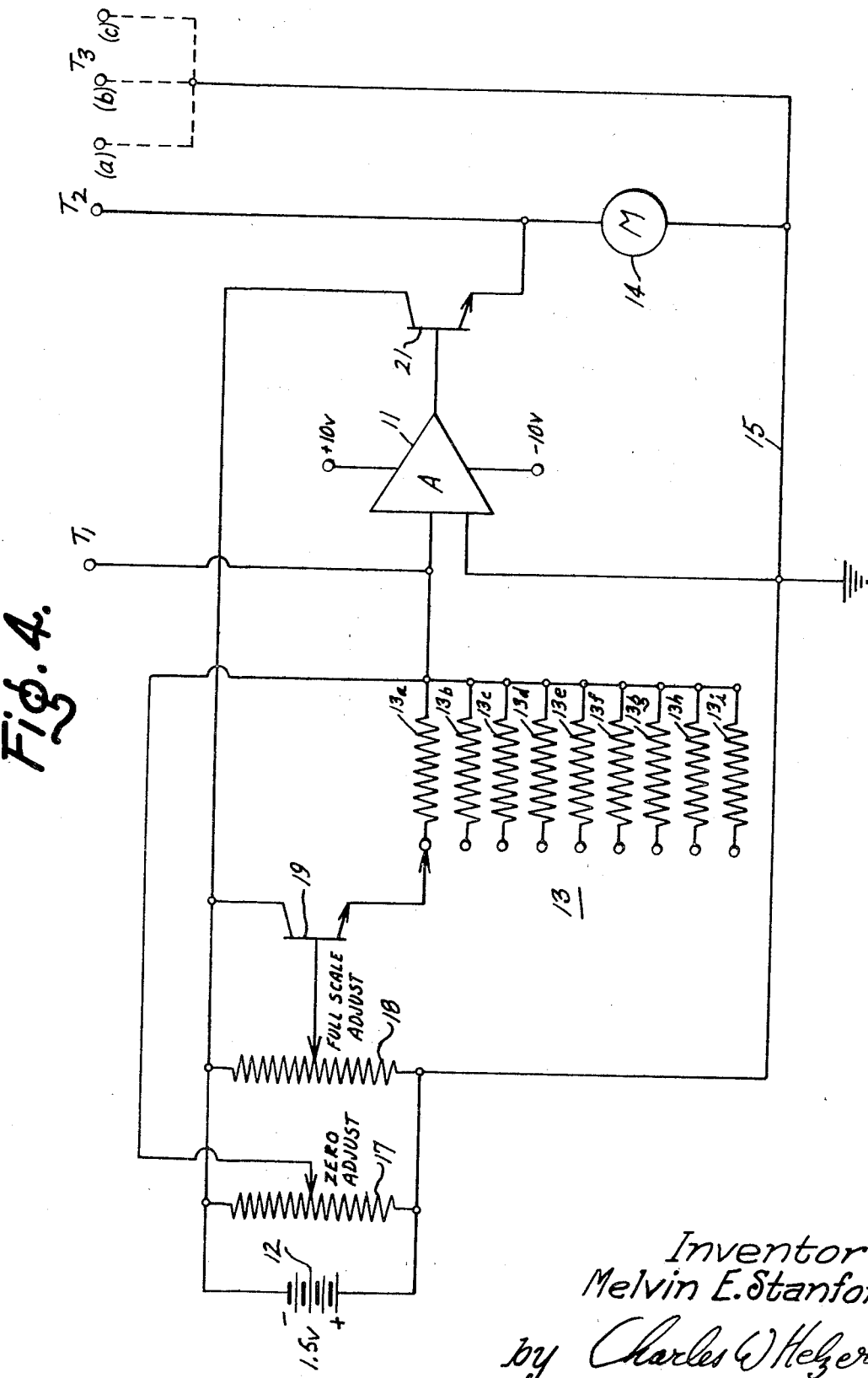

ISOLATION-GUARDING MEASURING INSTRUMENT FOR IN-CIRCUIT COMPONENT TESTING

This application is a continuation of application U.S. Ser. No. 713,436, filed Mar. 5, 1968 entitled "Isolation Guarding Measuring Instrument For In-Circuit Component Testing," Melvin E. Stanford, inventor, and assigned to Systomation, Inc.

BACKGROUND OF THE INVENTION

1. Field of the Invention

This invention relates to a new isolation guarding measuring instrument for obtaining an in-circuit component measurement of the actual value of an in-circuit component comprising a part of electronic equipment without requiring that the component be "lifted" or disconnected even partially from the other components with which it is in circuit relationship.

More specifically, the invention relates to a novel, portable, isolation-guarding volt-ohmmeter comprising an operational amplifier having a conventional voltmeter meter movement connected across the output and having two normal input leads connecting the in-circuit component to be measured to the input of the operational amplifier and a third isolation-guarding lead. The third isolation-guarding lead in conjunction with the two normal input leads allows for the isolation and measurement of a component in-circuit without requiring that the component be lifted or disconnected even partially from the other components with which it is in circuit relationship. As a result, the novel isolation-guarding measuring instrument "ses" and therefore measures, only a component of interest without the measurement being seriously affected in adverse manner by other components connected in parallel circuit relationship with the component of interest. This is achieved with the isolation-guarding instrument by applying a current of predetermined amount through the two normal input leads across an in-circuit component while utilizing the third isolation guarding lead to block alternate paths of excitation current that otherwise would throw off the measurement of the desired in-circuit component. The isolation guarding measuring instrument, because of its simplicity and portability, can be carried easily by an electronic technician, television service man, etc., to a job location where a particular piece of electronic equipment to be serviced, is located and greatly facilitates circuit analysis and trouble shooting work in connection with electronic equipment of all kinds.

2. Description of Prior Art

Present techniques for circuit analysis and trouble shooting electronic circuits in the field are quite time consuming, troublesome, expensive, inherently destructive of the circuits being analyzed and otherwise unsatisfactory. This is due to the fact that almost all known techniques of electronic circuit analysis and trouble shooting require that a particular component to be tested in an electronic equipment, be lifted or at least partially disconnected by unsoldering, etc., the component from the other components with which it is connected in circuit relationship. The disadvantages inherent in these known techniques are to numerous and almost too obvious to require listing. To begin with, techniques involving "lifting" of a component are time-consuming arduous, and require the talents of skilled electronic technicians. These requirements alone make such techniques expensive. In addition to these objectionable characteristics, the process of "lifting" a component to be tested from its circuit environment is inherently destructive of the circuit and invariably alters somewhat the circuit characteristics. If great care is not exercised in resoldering the component after it has been tested, then the possibility of a circuit fault developing as a result of the test procedure is greatly enhanced. To overcome these difficulties and objectionable characteristics of the existing circuit techniques, the isolation-guarding measuring instrument comprising the present invention was devised.

SUMMARY OF INVENTION

It is therefore a primary object of the present invention to provide a new, portable, isolation guarding measuring instrument for obtaining a measurement of the actual value of an in-circuit component without requiring that the components be "lifted" or disconnected even partially from other components with which it is in circuit relationship.

Another object of the invention is to provide such a portable, isolation-guarding measuring instrument which is relatively simple in design, inexpensive, and reliable in operation, and which can be carried easily by an electronic equipment technician or serviceman to the location of a particular piece of electronic equipment to be serviced.

In practicing the invention, a novel, portable, isolation-guarding measuring instrument is provided which comprises meter means for providing an indication of the magnitude of an electrical signal. First and second input measurement terminal lead means are provided for coupling the opposite terminals of an in-circuit component to be measured to the meter means and to an excitation signal source. Third isolation-guarding terminal lead means which are maintainable at essentially the same potential as the potential of one of the first and second input measurement terminal lead means, is provided for connection to nodal points of other circuit components coupled in parallel circuit relationship with the in-circuit component to be measured. As a result, measurement of the actual value of the in-circuit component can be obtained without requiring that the in-circuit component be disconnected even partially from the other components with which it is in circuit relationship.

In a preferred form of the isolation-guarding measuring instrument, operational amplifier means are included which have the input terminal maintained at essentially zero reference potential. Electric signal-sensitive meter means are coupled to the output of the operational amplifier means for providing an indication of the magnitude of the output signal from the operational amplifier means. First and second input measurement terminal lead means are supplied for coupling the opposite terminals of an in-circuit component to be measured to the operational amplifier means and to a source of excitation signal. Third isolation-guarding terminal lead means are provided which are maintained at essentially the same potential as the potential of one of the first and second input measurement terminal lead means, and is connected to nodal points of other circuit components coupled in parallel circuit relationship with the in-circuit component to be measured.

While the preferred embodiments of the novel isolation-guarding measurement instrument described herein comprises isolation-guarding volt-ohmmeters, it is to be expressly understood that the novel isolation-guarding measuring instrument is in no way limited in its use to the measurement of resistance only. The instrument can be readily adapted to measure the actual value of any in-circuit component such as resistors, capacitors, inductors, or can be employed to measure the voltage drop across a semiconductor junction such as are used in semiconductor diodes, transistors, etc., while the semiconductor is connected in circuit relationship with other circuit components, and without requiring that the semiconductor be disconnected even partially from the circuit. In all of these anticipated applications, the isolation-guarding measuring instrument obtains not only a check of the fact that a particular in-circuit component of interest is in working condition, but also provides a measurement of the actual value of the component of interest. This is obtained without requiring that the component be unsoldered from its associated circuitry.

BRIEF DESCRIPTION OF DRAWINGS

Other objects, features, and many of the attendant advantages of this invention will be appreciated more readily as the same becomes better understood by reference to the following detailed description, when considered in connection with the accompanying drawings, wherein like parts in each of the several figures are identified by the same reference character, and wherein:

FIG. 4 is a detailed schematic circuit diagram of a practical circuit design for an isolation-guarding measuring instrument constructed in accordance with the invention, and which comprises a volt-ohmmeter type of instrument that is similar in many respects to the form of the measuring instrument shown in FIG. 2.

DETAILED DESCRIPTION OF PREFERRED EMBODIMENTS

Figure 1:
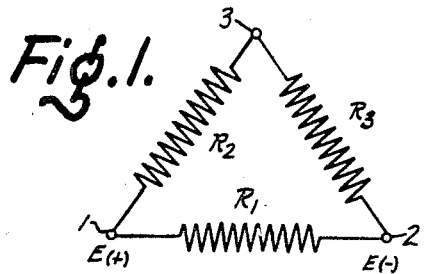
FIG. 1 is a schematic circuit diagram of a resistor matrix of the type often encountered in electronic circuits, and is utilized to illustrate the guarding concept employed in the present invention.

FIG. 1 of the drawings illustrate a circuit matrix of three resistors $R_1$, $R_2$ and $R_3$ interconnected together at the terminal points 1, 2 and 3. The matrix of resistors $R_1$–$R_3$ depict a very common circuit connection occurring in electronic equipment of all types wherein, if it is desired to measure one of the components such as resistor $R_1$, there are a number of additional components such as $R_2$ and $R_3$ connected in parallel circuit relationship with it. In all such circumstances, the additionally connected circuit components such as $R_2$ and $R_3$ will be interconnected through common junction points such as 1, 2 and 3 hereinafter termed nodal points. It is to be expressly understood that the specific resistor matrix shown in FIG. 1 is intended only to depict a typical circuit situation showing parallel connected components interconnected with a component $R_1$ desired to be measured. Also, it should be noted at this point that while resistors are shown for convenience, the isolation-guarding measuring instrument described herein is not limited to the measurement of resistive components only but also may be employed to measure capacitive components, inductive components, and active components such as semiconductor diodes, transistors, nd the like, where it is desired to know characteristics such as the forward voltage drop of a semiconductor diode or some other semiconductor junction, etc. Accordingly, it should be kept in mind that FIG. 1 is intended to depict an entirely general circuit configuration where, for convenience of illustration, a simple resistor matrix has been selected as a typical example of the measuring situation to be overcome by the instant portable, guarding isolation measuring instrument.

From a consideration of FIG. 1, it will be appreciated that if a conventional volt-ohmmeter were to be employed in the usual manner to measure the value of the resistor $R_1$, and if its normal two inputs were connected across the opposite terminals 1 and 2 of resistor $R_1$, the result would be to drive an excitation current (also known as a measuring current) not only through the resistor $R_1$, but also through the parallel path comprised by the series connected resistors $R_2$ and $R_3$. Assuming that all three resistors $R_1$–$R_3$ are of comparable size (i.e., ohmage), then it will be appreciated that the reading obtained with the above hypothetical measuring arrangement would not give a correct reading of the actual value of resistor $R_1$ due to the parallel current path through resistors $R_2$ and $R_3$.

In the past, to avoid improper measurements such as described above, electronic technicians and service repairmen have "lifted" one end of the component to be measured. In the present example $R_1$ would be "lifted" by unsoldering one terminal of the resistor $R_1$ from the terminal point 1, for example. Thereafter, the volt-ohmmeter could be connected to the unsoldered terminal of component $R_1$ and to terminal 2, and would provide a true reading of the actual value of resistor $R_1$. After this has been accomplished, and assuming that the component checks out and meets specifications, it would then be necessary to resolder the end of the component back to the original junction point, namely terminal 1. The entire process is time consuming, arduous and requires the talents of an experienced electronic technician or television service repairman. These factors alone make such a process expensive. In addition, if the technician is not careful in resoldering the end of the component $R_1$ back to the junction point 1 after $R_1$ has been checked, the overall circuit characteristics may be adversely altered. Furthermore, the resoldered connection may be more subject to failure than if the disconnection had never been effected. In addition to the above mentioned undesirable aspects, assuming that the component $R_1$ satisfies specifications, the technician then must continue on and check out each of the components $R_2$ and $R_3$. In the example in question, this would involve unsoldering at least two of the three junction points 1–3 in order to measure all three components. In the average electronic circuit employed today in consumer and industrial electronic circuitry, not to mention military electronic circuitry, there are large numbers of junction or nodal points such as those depicted by the points 1, 2 and 3. Hence, it can be appreciated that the problems associated with present-day circuit analysis and trouble shooting techniques are many and burdensome.

In order to overcome the above-described difficulties with present-day circuit analysis and trouble shooting techniques, the present invention makes available an isolation guarding measuring instrument with which it is possible to guard out or isolate the particular component desired to be measured while it is connected in circuit relationship with other components and without requiring that the component to be measured, be "lifted" or disconnected even partially from the other components. There are two basic methods by which a component in a circuit may be isolated or guarded from other components. In the circuit shown in FIG. 1, the resistor $R_1$ can be measured by forcing a known current through it and measuring the resulting voltage across it, or by placing a known voltage across it and measuring the resulting current through it. In either event, as is true in any measuring scheme, a potential (even if momentary) is placed across the component, namely $R_1$, in order to effect the measurement. The parallel circuit formed by the series connected resistors $R_2$ and $R_3$ can be "guarded out" or "isolated" by forcing the nodal point shown at 3 to be at the same potential as one side of the component $R_1$ to be measured. In FIG. 1, assume that the terminal of component $R_1$ identified as number 1 is maintained at potential $E+$ and that the opposite terminal 2 is maintained at $E-$. Under these conditions, to guard out the parallel path, $R_2$, $R_3$, the nodal point 3 should be maintained at the potential of either $E+$ or $E-$. If nodal point 3 is maintained at potential $E+$, there is no potential difference across the resistor $R_2$ and hence no current flow can take place through this resistor. Accordingly, the current of interest to be measured in order to determine the value of resistor $R_1$ is the current appearing at terminal 1 ($E+/R_1$). Similarly, if the nodal point 3 is maintained at potential $E-$, then there can be no current flow through resistor $R_3$, and the current to be measured is the current at terminal 2 ($E-/R_1$).

From the above description certain basic rules for guarding can be derived. Considering Fig. 1, for example, one can start at either end of the component ($R_1$) to be measured and guard by placing each nodal point around the component $R_1$ at the same potential as one end of the component $R_1$ being measured. In more complex circuits, to isolate start at one end of the component to be measured, and go across each current path from this point and place an isolation guarding potential at all nodal points encountered so that only a single current path through the component to be measured can be traced from the chosen starting point.

Figure 2:
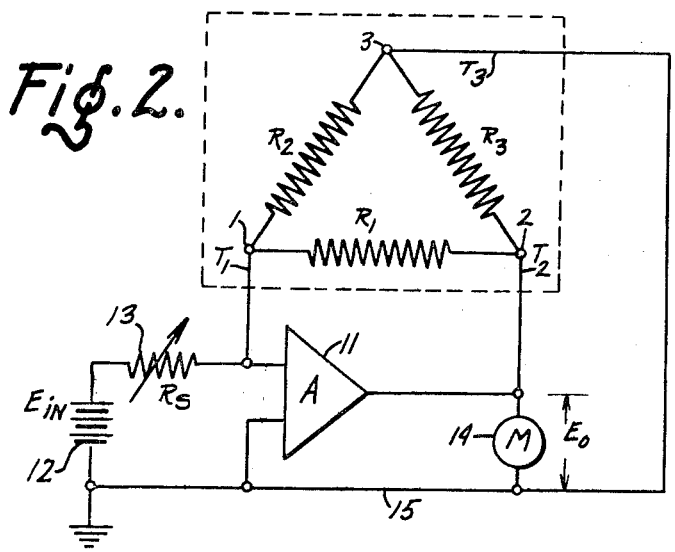
FIG. 2 of the drawings is a schematic circuit diagram of one form of a portable, isolation-guarding measuring instrument according to the invention, and which comprises an isolation-guarding volt-ohmmeter that employs an operational amplifier to achieve resistance measurement and to facilitate the guarding operation.

FIG. 2 of the drawings is a simplified, schematic circuit diagram of one suitable form of an isolation-guarding measuring instrument constructed in accordance with the invention. The measuring instrument shown in FIG. 2 comprises an isolation-guarding volt-ohmmeter and utilizes an operational amplifier 11 of conventional construction. The operational amplifier 11 may comprise any conventional, commercially available operational amplifier manufactured and sold by such firms as the G. A. Philbrick Researches of Boston, Massachusetts, or it may comprise the Zeltex operational amplifier sold by Zeltex, Inc. The characteristics of operational amplifiers are now well known, and have been described extensively in the published literature. For example, the G. A. Philbrick Researches of Boston, Massachusetts, have published a number of well known treatises on operational amplifiers referred to as the Palmist set which is available in most technical libraries. Another well known text that describes in detail the construction of operational amplifiers as well as their operational characteristics, is the textbook entitled "Electronic Analog Computers" by Huskey and Korn, published by the McGraw-Hill Book Co., Inc.

From a review of the published literature, it will be determined that one characteristic common to all operational amplifiers is that the input terminals thereof are maintained at essentially zero reference potential measured with respect to ground. The operational amplifier may be provided with adjusting potentiometers for initially adjusting the input terminal to this zero reference level, but thereafter the operational amplifier through its feedback circuitry will operate internally to maintain its input potential at essentially zero reference potential. By zero reference potential is meant that the input terminal essentially is maintained at zero potential with respect to ground, and thus it can be stated that the input to an operational amplifier is maintained at "virtual ground" potential. The manner in which this characteristic of an operational amplifier is used in the measuring instrument comprising the present invention, will be better appreciated after a reading of the following description.

The input terminal of operational amplifier 11 is connected to a source of excitation potential shown as a battery 12 through a suitable variable resistor 13 for adjusting the value of the input current supplied to operational amplifier 11. The output terminal of operational amplifier is connected across a suitable voltmeter meter movement 14 of conventional construction. The meter 13 is provided to derive an indication of the output voltage of the output terminal of the operational amplifier 11. For this purpose, meter 14 has one of its terminals connected to the output terminal of operational amplifier 11 and the remaining terminal connected to a grounded supply bus 15 that is connected back to one terminal of the battery 12, and to the grounding terminal of the operational amplifier 14.

The isolation guarding measurement instrument shown in FIG. 2 further includes first and second input measurement terminal lead means $T_1$ and $T_2$. The first lead means $T_1$ is connected to the input terminal of the operational amplifier 11 and to the terminal 1 of the component $R_1$ to be measured. The second input measurement terminal lead means $T_2$ is connected to the output terminal of operational amplifier 11 and to the remaining opposite terminal 2 of the component $R_1$ to be measured. The component $R_1$ to be measured is connected in parallel circuit relationship with the two series connected resistors $R_2$ and $R_3$ in a manner described previously with respect to FIG. 1 of the drawings. As a consequence of these connections, it will be seen that the component $R_1$ to be measured is in effect connected in the feedback path of the operational amplifier 11.

In addition to be above connections, the isolation-guarding measuring instrument shown in FIG. 2 further includes a third isolation-guarding terminal lead means $T_3$ which is connected directly to the ground supply terminal bus 15 and to the nodal point 3 of the electronic circuit in which the component $R_1$ is connected. The connection of the terminal lead means $T_1$, $T_2$ and $T_3$ may be effected in any known manner such as clips, pressure leads, suction cup leads, etc., which do not require breaking of the electronic circuit to be tested and comprised by the matrix of resistors $R_1$–$R_3$ in the instant example.

In operation, the isolation guarding measuring instrument shown in FIG. 2 functions in the following manner. The voltage $E_{in}$ of battery 12 is known, and the variable resistor 13 is set or selected to provide a known input current to the input terminal of operational amplifier 11. The unknown impedance $R_1$ to be measured is connected as a feedback resistor in the operational amplifier 11 in the manner shown in FIG. 2. With the measurement instrument thus adjusted, the value of the output voltage $E_o$ read by the meter 14 will be proportional to the feedback resistance $R_1$. Guarding (isolation) is accomplished by attaching the third isolation guarding terminal lead means $T_3$ which is at circuit ground or common potential to the nodal point 3. This results in placing no potential across the resistor $R_2$ since the operational amplifier input terminal is maintained at "virtual ground" by inherent operation of the operational amplifier 11, as discussed briefly above. Hence no current flow will take place through resistor $R_2$. Current flow through the resistor $R_3$ to ground will appear only as a load on the operational amplifier output. Accordingly, in the instrument shown in FIG. 2, the output voltage $E_o$ will be directly proportional to $R_1$ only. If the guarding potential were not applied to the nodal point 3, the output voltage $E_o$ would be proportional to $R_1$ in parallel with $R_2$ plus $R_3$.

There are certain limitations on the manner of operating the isolation guarding measuring instrument shown in FIG. 2. These limitations have to do with the relative values of the components which are connected in circuit relationship with a component to be measured and basically define or limit the types of circuits with which the novel measuring instrument can be used. These limitations are:

1. If the component $R_2$ has too low a value, the operational amplifier 11 may be unstable in operation.

2. If the component $R_3$ has too low a value, the operational amplifier 11 may not be able to supply sufficient current to drive this component as a load, and as a consequence, the value of the output voltage $E_o$ may be adversely affected.

3. If extremely small values of resistance are to be measured so that higher current are involved, the resistance of the input terminal leads $T_1$ and $T_2$ as well as the resistance of the isolation guarding terminal lead $T_3$ become significant, and can cause sufficient potential drops to adversely affect the validity of a measurement.

Figure 3:
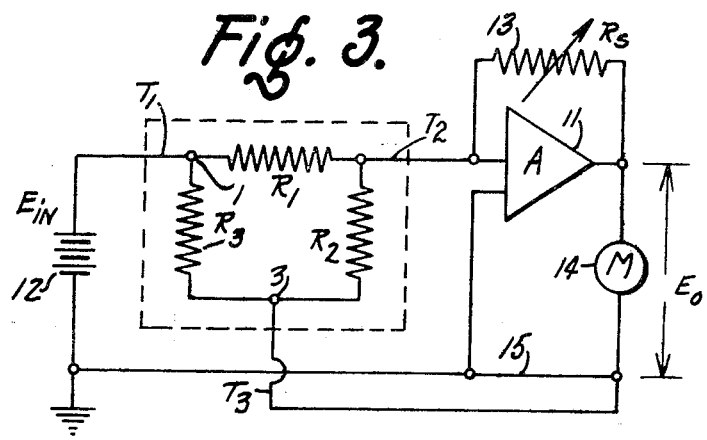
FIG. 3 of the drawings is a schematic circuit diagram of a second form of an isolation-guarding volt-ohmmeter constructed in accordance with the invention.

FIG. 3 of the drawing illustrates a modified form of a novel isolation-guarding volt-ohmmeter constructed in accordance with the invention. In the embodiment of the invention shown in FIG. 3, an operational amplifier 11 is in employed which has a conventional voltmeter meter movement 14 connected across its output, and a source of known excitation voltage 12 comprising a battery connected to its input. In the arrangement shown in FIG. 3, the first and second input measurement terminal lead means $T_1$ and $T_2$ serve to connect the excitation current source comprised by battery 12 through the unknown impedance $R_1$ to be measured and thence to the input terminal of the operational amplifier 11. The third isolation guarding lead means $T_3$ is connected to the junction 3 and serves to maintain the potential of this point at essentially ground potential. The second input measurement terminal lead $T_2$ is connected to the input terminal of the operational amplifier 11, and hence is maintained at "virtual ground." The point 3 therefore is maintained at essentially the same potential as the point 2, and no current flow can take place through resistor $R_2$. The feedback path of the operational amplifier 11 is provided with a variable resistor 13 for adjusting the value of the feedback current supplied to operational amplifier 11.

In operation, the arrangement shown in FIG. 3 will function in much the same manner as the species of the invention shown in FIG. 2 with the exception that the adjustable resistor 13 now is employed to adjust input current supplied to operational amplifier 11 to a known value, and its reading then is proportional to the value of the unknown resistor $R_1$ to be measured. This result is due to the fact that the battery 12 of known voltage supplies current through the unknown resistor $R_1$ to be measured to the input of operational amplifier 11, which input current is of unknown value due to the fact that $R_1$ is unknown. By proportioning the value of the feedback resistor 13 to adjust the input current to operational amplifier 11 to a known value, and hence providing a known output voltage as measured by meter 14, the setting of the variable resistor 13 will be proportional to the value of the unknown resistor $R_1$, and hence provides the desired measurement. The parallel path comprised by resistor $R_2$ and $R_3$ is prevented from adversely affecting the measurement by the guarding or isolation potential supplied by $T_3$.

FIG. 4 of the drawings is a detailed schematic circuit diagram of a novel isolation-guarding volt-ohmmeter constructed in accordance with the invention, and illustrates the additional detailed circuitry that normally would be employed in a commercial embodiment of the instrument to be offered for sale. In the preferred embodiment of the invention shown in FIG. 4, an operational amplifier 11 is used, and may comprise a conventional, commercially available operational amplifier such as that manufactured and sold by Philbrick Researches of Boston, Massachusetts, or Zeltex Corp. The output of operational amplifier 11 is effectively coupled across a conventional voltmeter meter movement 14 such as those manufactured and sold by the General Electric Company through its meter department. The input terminal of the operational amplifier 11 is connected to the output of a resistor matrix 13 whose multiplicity of range-changing (calibrating) resistors $13a$ through $13_t$ are selectively connected in circuit relationship the medium of a selector switch contact adjusted by an operator of the instrument so that the instrument can be used in the measurement of a wide range of resistance values. A source of excitation signal current is supplied to the input of operational amplifier 11 through the calibrating resistors 13 from a 1.5-volt battery 12. An in-circuit resistor whose value is to be measured, is connected between the two input measurement terminals $T_1$ and $T_2$ where $T_1$ is connected to the input terminal of the operational amplifier 11 and hence is maintained at "virtual ground" through the internal operations of the operational amplifier itself. The second input measurement terminal $T_2$ is effectively connected to the output of the operational amplifier 11 along with the meter 14. A third isolation-guarding lead $T_3$ is directly connected to the ground supply terminal bus bar 15, and for convenience, may include a multiplicity of leads shown in dotted outline form at $(a)$, $(c)$, and $(c)$ to enable the third isolation-guarding lead $T_3$ to apply guarding potential to a multiplicity of points in any circuit that includes the in-circuit component to be measured.

In addition to the above-listed elements, the isolation guarding volt-ohmmeter shown in FIG. 4 further includes an input potential adjusting variable resistor 17 which is connected across the 1.5-volt battery 12 and has its variable contact point connected directly to the input terminal of operational amplifier 11. By reason of this connection, the contact point of variable resistor 17 may be adjusted to initially adjust the input potential of operational amplifier 11 to essentially zero reference potential prior to making a measurement with the instrument. A second input signal current full scale adjust variable resistor 18 is connected in parallel with the zero adjust variable resistor 17 across the 1.5-volt battery 12, and has its variable contact point effectively connected through the matrix of calibrating resistors 13 to the input of operational amplifier 11. The variable resistor 18 can be employed to initially adjust the full scale value of the input signal current supplied to the input of the operational amplifier 11 through any one of the selected range-changing calibrating resistors $13_a$ through $13_t$.

In order to assure adequate measuring current for the instrument, a pair of transistor amplifiers are included in the instrument shown in FIG. 4. These transistor amplifiers are comprised by a first NPN transistor-follower amplifier 19 which has its base electrode connected directly to the variable contact of the full scale adjusting resistor 18, its collector connected to the negative terminal of the battery 12, and its emitter connected directly to the variable contact point of the calibrating selector switch contact of resistor matrix 13. A second transistor follower amplifier 21 has its base electrode connected directly to the output of operational amplifier 11, its collector electrode connected back to the negative terminal of the battery 12, and its emitter electrode connected to the input of meter 14 and to the second input measurement terminal $T_2$.

In operation, the circuit shown in FIG. 4 functions in precisely the same manner as the FIG. 2 circuit. The structure of FIG. 4, however, includes the additional zero adjusting potentiometer 17 for initially aligning the operational amplifier 11 so at the beginning of each measurement its input terminal is at "virtual ground." The full scale adjusting resistor 18 allows the operator of the instrument to initially adjust the full scale value of the current supplied through a selected one of the calibrating resistors $13_a$ through $13_t$, to assure adequate sensitivity of the instrument within a selected resistance measurement range. The two emitter-follower amplifiers 19 and 21 are included in order to assure adequate driving current to the input of operational amplifier 11, and to assure adequate output voltage to actuate the meter movement 14, respectively.

In making a measurement with the isolation-guarding instrument shown in FIG. 4, an electronic technician, television serviceman, etc., would initially connect the input measurement leads $T_1$ and $T_2$ across an in-circuit resistor desired to be measured. Thereafter he would connect the third isolation-guarding lead $T_3$ (using any number of the additional lead elements) $(a)$, $(b)$, $(c)$, (etc.) in order to guard out all of the parallel paths around the component desired to be measured by connecting these several isolation guarding leads to each nodal point of alternate current paths around the resistor to be measured. Thereafter the zero adjust resistor 17 is adjusted to bring the input potential of the input terminal of amplifier 11 to its "virtual ground" zero reference potential. At this point, if the electronic technician is at all familiar with the circuit being tested, he can select immediately the appropriate calibrating resistors $13_a$ through $13_t$ to be used in making the measurement. Otherwise, it may be necessary for him to check two or three to select the appropriate one. Assuming that the appropriate calibrating resistor turns out to be resistor $13_e$, which is of known value, the full scale adjust resistor 18 can be adjusted to supply a known predesigned current between zero input current and full scale current to the input of the operational amplifier 11. The current supplied to the input of operational amplifier will be known to be at this predesigned current value since the value of the calibrating resistance $13_e$ is known as well as the current setting of the resistor 18 and the value of the voltage from battery 12. The reading of the meter 14 (which is appropriately marked or calibrated) will then be proportional to the resistance value of the in-circuit resistor connected across the input measurement terminals $T_1$ and $T_2$. This testing procedure may then be conducted with as many components as desired in order to completely analyze a circuit in question.

From the foregoing description, it will be appreciated that the present invention provides a new, portable, isolation-guarding measuring instrument for obtaining a measurement of the actual value of an in-circuit component comprising a part of an electronic equipment without requiring that the component be "lifted" or disconnected even partially from other components with which it is in circuit relationship. The portable, isolation-guarding measuring instrument is relatively simple in design, inexpensive and reliable in operation. Further, because of its simple and portable character, the instrument can be carried easily by an electronic equipment technician or serviceman to the location of a particular piece of electronic equipment to be serviced.

Having described several embodiments of a new isolation-guarding measuring instrument constructed in accordance with the present invention, it is believed obvious that other modifications and variations of the invention are possible in the light of the above teachings. It is therefore to be understood that changes may be made in the particular embodiments of the invention described which are within the full intended scope of the invention as defined by the appended claims.

I claim:

1. A portable guarding instrument for measuring the in-circuit impedance of a circuit component connected to as least one other circuit component in a circuit having at least three junction nodal points comprising, in combination feedback amplifier means having an input maintained at virtual ground potential through internal feedback circuitry and adapted for connection to a source of excitation signals, meter means for providing an indication of an electrical signal connected between the output of the amplifier means and a source of ground potential, first and second input measurement lead means for coupling to nodal points formed by the opposite terminals of a component under test, said first lead means adapted for connection to a source of excitation signals and said second lead means connected to said amplifier, and third isolation guarding lead means for coupling to remaining junction nodal points of other components connected in circuit relationship with the component under test, said third lead means being connected to a source of potential maintained at the potential of one of said first or second lead means whichever is at the virtual ground potential of the feedback amplifier input whereby essentially zero potential is maintained across other in-circuit components not being tested as a result of the third isolation guarding lead connection thereby to provide a measurement of the actual value of the in-circuit component being tested without requiring that the in-circuit component be disconnected even partially from the other components with which it is in circuit relationship.

2. An isolation-guarding measuring instrument according to claim 1 wherein the third isolation-guarding lead means is maintained essentially at the potential of the first input measurement lead means, the first lead means is connected to the input of the feedback amplifier means and is maintained at virtual ground potential, and the second input measurement lead means is connected to the output of the feedback amplifier means whereby the in-circuit component to be measured is connected in the feedback path of the feedback amplifier means.

3. An isolation-guarding measuring instrument according to claim 2 wherein the source of excitation signal comprises means for supplying an input current of known value to the input of the feedback amplifier means and the output of the feedback amplifier means is proportional to the value of the feedback impedance of the in-circuit component being measured.

4. An isolation-guarding measuring instrument according to claim 3 wherein the means for supplying an input current of known value to the input of the feedback amplifier means comprises a matrix of calibrating resistors of known differing values and selector switch means for connecting desired ones of the calibrating resistors in circuit relationship with a source excitation signal and the input of the amplifier means.

5. An isolation-guarding measuring instrument according to claim 4 further including input potential adjusting variable resistor means coupled to the input of the feedback amplifier means for initially adjusting the potential of the feedback amplifier means input to a value of virtual ground potential prior to a measurement being taken with the instrument.

6. An isolation-guarding measuring instrument according to claim 5 further including a second input signal current full scale adjust variable resistor means coupled to the matrix of calibrating resistors for initially adjusting the full scale value of the input signal current supplied to the input of the feedback amplifier means.

7. An isolation-guarding measuring instrument according to claim 6 further including first transistor emitter-follower amplifier means interconnected between the output of the second input signal current full scale adjust variable resistor means and matrix of calibrating resistors and second transistor emitter-follower amplifier means interconnected between the output of the amplifier means and the meter means.

8. An isolation-guarding measuring instrument according to claim 7 further including a multiplicity of terminals on the third isolation-guarding terminal lead means for connection to a multiplicity of junction nodal points.

9. An isolation-guarding measuring instrument according to claim 1 further including a multiplicity of terminals on the third isolation-guarding terminal lead means for connection to a multiplicity of junction nodal points.

10. An isolation-guarding measuring instrument according to claim 1 wherein the third isolation-guarding lead means is maintained essentially at the potential of the second input measurement lead means, the second input measurement lead means is connected to the input of the feedback amplifier means and is maintained at virtual ground potential, and the first input measurement lead means is connected to a source excitation signal whereby excitation current is first supplied through the in-circuit component to be measured and thence to the input to the feedback amplifier means.

11. An isolation-guarding measuring instrument according to claim 10 further including means for adjusting the feedback current of the feedback amplifier means and an input current of known value is supplied to the input terminal of the feedback amplifier means and the adjusted value of the impedance in the feedback path of the feedback amplifier means is proportional to the value of the impedance of the in-circuit component being measured.

12. A portable guarding instrument for measuring the in-circuit impedance of a circuit component connected to at least one other circuit component in a circuit having at least three junction nodal points comprising in combination feedback amplifier means having an input maintained at virtual ground potential through internal feedback circuitry and an output, meter means coupled to the output of the feedback amplifier means for providing an indication of the value of the output signal from the feedback amplifier means, first and second input measurement lead means for coupling nodal points formed by the opposite terminals of an in-circuit component to be measured to the feedback amplifier means and to a source of excitation signal, and third isolation-guarding lead means connected to a source of potential maintained at essentially the same potential as the potential of one of said first and second input measurement lead means whichever is maintained at virtual ground potential, said third lead means being applied to remaining nodal points of other circuit components coupled in parallel circuit relationship with the in-circuit component to be measured whereby essentially zero potential difference is maintained across other in-circuit components not being tested and measurement of the actual value of the in-circuit component being tested can be obtained without requiring that the in-circuit component be disconnected even partially from the other components with which it is in circuit relationship.

13. An isolation-guarding measuring instrument for measuring the value of an in-circuit component of an electrical circuit under test at different points in an electrical circuit having at least one other junction nodal point coupled to it in circuit relationship, comprising feedback amplifier means having an input maintained at virtual ground potential through internal feedback circuitry and an output, meter means coupled to the output of the feedback amplifier means for providing an indication of the value of the output signal from the feedback amplifier means, first and second input measurement lead means for coupling nodal points of an in-circuit component to be measured to said feedback amplifier means, and isolation-guarding lead means connected to a source of potential maintained at essentially the same potential as one of said input measurement lead means whichever is maintained at virtual ground potential for coupling to other in-circuit junction nodal points connected in circuit relationship with the component to be tested whereby essentially zero potential difference is maintained between the component being tested and other in-circuit junction nodal points connected to said isolation-guarding lead means and the actual value of any given in-circuit component can be tested without requiring that the circuit under test be dismantled.

* * * * *